United States Patent [19]

Ogawa et al.

[11] Patent Number: 5,502,568
[45] Date of Patent: Mar. 26, 1996

[54] OPTICAL POSITION DETECTING UNIT, OPTICAL COORDINATE INPUT UNIT AND OPTICAL POSITION DETECTING METHOD EMPLOYING A PATTERN HAVING A SEQUENCE OF 1'S AND 0'S

[75] Inventors: Yasuji Ogawa; Hideo Yoichi, both of Saitama, Japan

[73] Assignee: Wacom Co., Ltd., Saitama, Japan

[21] Appl. No.: 281,129

[22] Filed: Jul. 28, 1994

Related U.S. Application Data

[63] Continuation-in-part of Ser. No. 215,761, Mar. 22, 1994.

[30] Foreign Application Priority Data

Mar. 23, 1993 [JP] Japan ..................... 5-87940
Dec. 29, 1993 [JP] Japan ..................... 5-354442

[51] Int. Cl.[6] ................ G01B 11/14; H01J 40/14; G03B 19/10
[52] U.S. Cl. ............... 356/375; 250/222.1; 345/175; 345/179
[58] Field of Search ............... 250/221, 222.1; 345/175, 179, 182–183; 356/375, 373

[56] References Cited

U.S. PATENT DOCUMENTS

| | | | |
|---|---|---|---|
| 3,951,550 | 4/1976 | Slick ..................... | 356/152 |
| 4,092,072 | 5/1978 | Ellis ..................... | 356/152 |
| 4,209,254 | 6/1980 | Reymond et al. ..................... | 356/152 |
| 4,550,250 | 10/1985 | Mueller et al. ..................... | 356/375 |
| 4,688,933 | 8/1987 | Lapeyre ..................... | 345/175 |
| 4,710,028 | 12/1987 | Grenier et al. ..................... | 356/375 |
| 4,851,616 | 7/1989 | Wales et al. ..................... | 345/175 |
| 4,946,277 | 8/1990 | Marquet et al. ..................... | 250/237 R |
| 5,073,770 | 12/1991 | Lowbner ..................... | 345/179 |
| 5,148,016 | 9/1992 | Murakami et al. ..................... | 250/221 |
| 5,159,322 | 10/1992 | Loebner ..................... | 345/179 |
| 5,166,668 | 11/1992 | Aoyagi ..................... | 340/710 |
| 5,196,900 | 3/1993 | Pettersen ..................... | 356/375 |
| 5,227,622 | 7/1993 | Suzuki ..................... | 250/221 |
| 5,296,838 | 3/1994 | Suzuki ..................... | 250/221 |
| 5,298,737 | 3/1994 | Proper ..................... | 250/221 |
| 5,355,222 | 10/1994 | Heller et al. ..................... | 356/375 |

FOREIGN PATENT DOCUMENTS

| | | | |
|---|---|---|---|
| 58-064581 | 4/1983 | Japan ..................... | 345/179 |
| 5-19954 | 1/1993 | Japan . | |

OTHER PUBLICATIONS

"Production of Distance Detector using PSD," *Transistor Technique*, Aug. 1990, pp. 79–88 Shokodo, Coding Theory, 1973, pp. 474–499.

"Maximum Length Sequence and Application thereof," *Electronics, Information and Communication Society Journal*, vol. 76, No. 12, pp. 1337–1340, Dec. 1993.

Gaston, C. A. "Pencil Position Monitor" IBM Technical Disclosure Bulletin, vol. 12, No. 12, May 1970, p. 2361.

*Primary Examiner*—Frank Gonzalez
*Assistant Examiner*—Jason D. Eisenberg
*Attorney, Agent, or Firm*—Lowe, Price, LeBlanc & Becker

[57] ABSTRACT

An optical position detecting unit is configured by an image pickup unit for detecting the intensity of light, a pattern member disposed in the front of the image pickup unit and on a light path of the light and having a specific pattern, and a signal processing unit for extracting information with respect to the distance in the direction of a normal line of a pixel array region of the image pickup unit between a light-emitting source and the image pickup unit on the basis of signals with respect to the specific pattern projected to the pixel array. A distance between the pattern member and the pixel array of the image pickup unit is required to be known in advance in order to extract the information with respect to the distance. By using only one image pickup unit, the distance to the light-emitting source can be calculated.

11 Claims, 13 Drawing Sheets

OUTPUT LEVEL OF PIXEL

PIXEL POSITION OF CCD LINEAR IMAGE SENSOR $X_{-7}$ $X_{-6}$ $X_{-5}$ $X_{-4}$ $X_{-3}$ $X_{-2}$ $X_{-1}$ $X_0$ $X_1$ $X_2$ $X_3$ $X_4$ $X_5$

42

43 POSITION OF CENTER OF GRAVITY

"1" "0" "0" "0" "1"

"0" "1" "0" "1" "0"

"1" "1" "0" "1" "1"

"1" "0" "0" "0" "1"

ent application is a continuation in part of U.S. Ser. No. 08/215,761, filed on Mar. 22, 1994.

OPTICAL POSITION DETECTING UNIT, OPTICAL COORDINATE INPUT UNIT AND OPTICAL POSITION DETECTING METHOD EMPLOYING A PATTERN HAVING A SEQUENCE OF 1'S AND 0'S

This application is a continuation in part of U.S. Ser. No. 08/215,761, filed on Mar. 22, 1994.

BACKGROUND OF THE INVENTION

1. Field of the Invention

The present invention relates to an optical position detecting unit, an optical coordinate input unit and an optical position detecting method. Particularly, it relates to an optical position detecting unit including an optical position pointer and a single photodetector. The position pointer includes a light-emitting portion for pointing its existing position by light emitted from the light-emitting portion and the photodetector detects the light. The optical position detecting unit detects the coordinates of a position pointed by the optical position pointer on the basis of the distance to the light-emitting portion and the direction of incidence of the light, both of which are detected by the single photodetector. Further it relates an optical coordinate input unit configured by using the optical position detecting unit, and an optical position detecting method of measuring the distance to the light-emitting portion by using the single photodetector.

2. Description of the Related Art

Heretofore, PSD (Position Sensitive Light Detector) is well known as an example of the unit for detecting position, direction, etc. The PSD is a light sensor by which the position of a spotlight radiated onto its light-receiving surface can be detected as a position on the light-receiving surface. The PSD in combination with a freely movable point light source can produce a position detecting unit for detecting the position of the existence of the point light source, or a direction detecting unit for detecting the direction of incidence of light from the point light source, or a distance measuring unit for measuring the distance between the point light source and a body of the detector, as described in "Production of Distance Detector using PSD", pp. 79–88, August 1990 issue of Transistor Technique.

JP-A-5-19954 discloses a conventional unit for obtaining indicated position information by using an optical configuration. This conventional unit includes a movable body with a light-emitting element which is moved on an operation table defining an XY coordinate plane thereon, and an X light-receiving portion and a Y light-receiving portion arranged respectively in the center of an X-direction side and a Y-direction side in the operation table. The conventional unit is configured such that light from the light-emitting element of the movable body is converged by an optical lens included in the respective light-receiving portions to thereby form images, and such that the X and Y coordinate values of the position designated by the movable body are obtained by using information of image-formed positions in the respective light-receiving portions.

In order to detect the position of a point light source by using the PSD, light coming from the point light source must be focused into a spotlight before the light is radiated onto the light-receiving surface for detection. To this end, it is necessary to provide an optical lens excellent in converging performance. Since the PSD is limited in the detectable distance between the light-receiving surface and the point light source, there is a significant limit in its practical use. Further, in the PSD, correction processing is required in order to obtain required detection accuracy. Also, in the optical coordinate information output unit disclosed in the literature (JP-A-5-19954), light from the light-emitting element must be converged onto the light-receiving portions through the optical lens so as to form spotlight-shape images on the light-receiving portions in order to obtain information of the position designated by the movable body. Accordingly, like the PSD, optical lenses excellent in converging performance are required from the point of view of detection accuracy.

SUMMARY OF THE INVENTION

A basic object of the present invention is to provide an optical position detecting unit including a light beam direction detecting section capable of detecting the direction of incidence of light with high accuracy without using optical lenses, and an optical position detecting method realized by using the optical position detecting unit, in order to solve the aforementioned problems.

An object of the present invention is to provide a cheap, compact and wide visual field angle optical position detecting unit and an optical position detecting method, in which a distance to a light-emitting portion can be calculated directly by using only one photodetector provided by using the light beam direction detecting section to reduce the number of photodetectors as extremely as possible, and which can be formed in a simple circuit structure.

Another object of the present invention is to provide a cheap and compact optical coordinate input unit configured by using the optical position detecting unit including a single photodetector.

The optical position detecting unit according to the present invention comprises an image pickup unit for detecting the intensity of light, a pattern member disposed in the front of the image pickup unit and on a light path of the light and having a specific pattern, and a signal processing unit for extracting information with respect to the distance in the direction of a normal line of a pixel array region of the image pickup unit between a light-emitting source of the light and the image pickup unit on the basis of a detected signal with respect to the specific pattern projected onto the pixel array region of the image pickup unit. It is necessary that the distance between the pattern member and the pixel array region of the image pickup unit is known in advance when the information with respect to the distance is extracted. By using only one image pickup unit, the distance to the light-emitting source can be calculated.

In the aforementioned configuration, it is preferable that the image pickup unit, the pattern member and the signal processing unit are united to form an optical position detecting device as one unit.

In the aforementioned configuration, it is more preferable that the signal processing unit includes a pixel signal detecting section for picking out a signal with respect to pixels of the image pickup unit, and a processing section for obtaining the information with respect to the distance on the basis of signals with respect to pixels; the image pickup unit, the pattern member and the pixel signal detecting section are united to form a device as one unit; the processing section is provided in the separately prepared host computer side; and the pixel signal detecting section and the processing section are connected by a communication unit.

In the aforementioned configuration, it is preferable that the specific pattern is a pattern having equal interval characteristic. For example, the "equal interval characteristic" of the pattern represents that a pattern structure contains portions arranged at regular intervals of a known distance. The signal processing unit calculates an enlargement ratio by using an image of the specific pattern projected on the basis of the known distance in the specific pattern to thereby extract the information with respect to the distance.

The image pickup unit contains a plurality of pixels which output signals detected in accordance with the equal interval portions of the specific pattern projected. The signal processing unit calculates the enlargement ratio by statistically processing the signals with respect to the portions of the pattern detected in the plurality of pixels, so that distance measurement can be performed with high accuracy.

The optical position detecting unit may be formed so that information with respect to the direction of incidence of the light into the pixel array region of the image pickup unit is extracted by using characteristic of M-sequence or M-plane contained in the specific pattern as well as the information with respect to the distance.

The optical position detecting unit may be formed so that the specific pattern is a two-dimensional pattern generated by using a one-dimensional linear pattern and another one-dimensional linear pattern perpendicular thereto in combination; the pixel array region of the image pickup unit is formed from pixels arranged in a two-dimensional lattice; and the signal processing unit integrates pixel signals outputted from the above-mentioned pixels with respect to the longitudinal and transverse directions of arrangement of the pixel array to thereby extract separately distance and direction information with respect to one axis.

The optical coordinate input unit according to the present invention is formed by using the aforementioned optical position detecting unit. The optical coordinate input unit further comprises a position pointer including a light-emitting portion for self-emitting light or indirectly emitting light. When, for example, a side switch of the position pointer is manipulated in a position pointing place while the position pointer is moved on an input surface on which a coordinate system is defined, light is emitted from the light-emitting portion. The above-mentioned optical position detecting unit is formed so that the unit detects light emitted from the light-emitting portion, calculates the distance and direction with respect to the position pointed by the position pointer and calculates coordinate data of the position. By using the distance and the direction of incidence of the light, the optical coordinate input unit can be formed as a two-dimensional digitizer. Alternatively, the distance alone may be detected so that the optical coordinate input unit can be used as a one-dimensional digitizer.

The optical coordinate input unit may be formed so that the unit further comprises a display unit for displaying information with respect to inputted coordinates so that a coordinate input surface on which a position is pointed by the position pointer is used as a display screen of the display unit.

The optical coordinate input unit may be formed so that the unit further comprises a display unit for displaying information with respect to inputted coordinates, and that the position pointer is used in the state of being placed on a finger of an operator, so that the display unit performs displaying in accordance with the motion of the finger.

The optical position detecting method according to the present invention is a method comprising the steps of: generating the shadow of a specific pattern containing an equal interval portion on a pixel array region of an image pickup unit on the basis of light emitted from a point light-emitting portion, in the condition that the direction of pattern arrangement of the specific pattern coincides with the direction of arrangement of the pixel array of the image pickup unit; calculating an enlargement ratio on the basis of detected signals outputted from respective pixels of the image pickup unit; and extracting information with respect to the distance in the direction of a normal line of the pixel array region between the light-emitting portion and the image pickup unit.

In the aforementioned method, it is preferable that the enlargement ratio is calculated statistically on the basis of respective signals outputted from a plurality of pixels contained in the image pickup unit.

In the method, the specific pattern contains M-sequence or M-plane characteristic; and information with respect to the direction of incidence of the light into the pixel array region of the image pickup unit is extracted on the basis of the M-sequence or M-plane characteristic as well as the information with respect to the distance.

In the method, the coordinates of the point light-emitting portion are calculated on the basis of the information with respect to the distance and the information with respect to the direction of incidence of the light.

In the aforementioned configuration, a point light source (light-emitting portion) is provided in a position pointer so that the intensity of light emitted from the point light source is detected by a CCD linear image sensor having a plurality of pixels. In this occasion, a pattern member whose distance from the sensor light-receiving region is known is disposed between the point light source and the CCD linear image sensor and provided with a specific pattern having equal interval characteristic and M-sequence or M-plane characteristic. When light from the point light source is radiated onto the pixel array region of the CCD linear image sensor, the pattern is projected onto the pixel array region. As a result, the respective pixels of the CCD linear image sensor detect the projected images of the pattern and generate signals respectively. An enlargement ratio of the projected pattern is calculated by statistically processing the output signals of the CCD linear image sensor on the basis of portions with respect to the above-mentioned equal interval characteristic, so that information with respect to the distance is obtained in accordance with a predetermined calculation equation by using the enlargement ratio. Further, the direction of incidence of the light emitted from the point light source can be detected in accordance with a predetermined arithmetic operation expression by using the M-sequence or M-plane characteristic contained in the specific pattern of the pattern member. By using the optical position detecting unit including one photodetector capable of detecting both the distance to the point light source and the direction of incidence of the light emitted from the point light source, an optical coordinate input unit having a simple structure can be formed.

DESCRIPTION OF THE PREFERRED EMBODIMENTS

Embodiments of the present invention will be described below with reference to the accompanying drawings.

Figure 1:
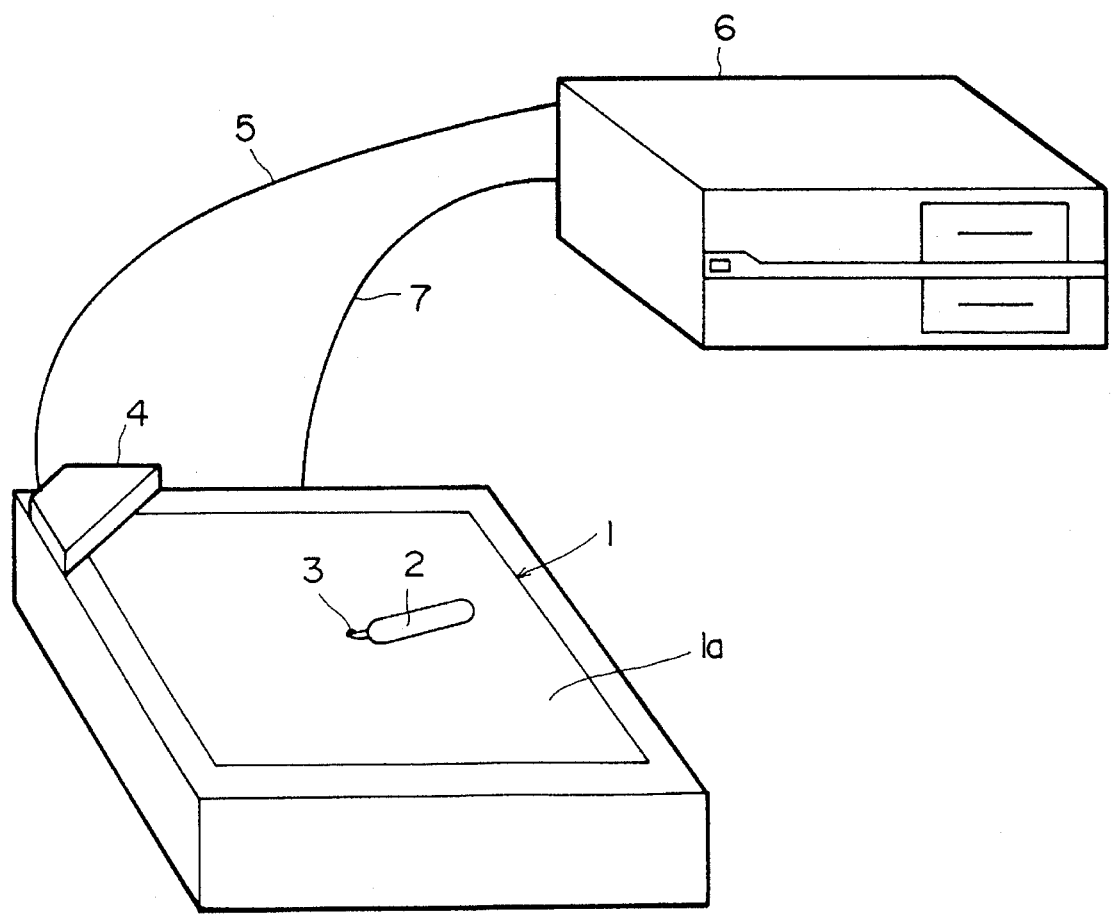
FIG. 1 is an external appearance diagram showing a first embodiment of an optical coordinate input unit including an optical position detecting unit according to the present invention.
Figure 2:
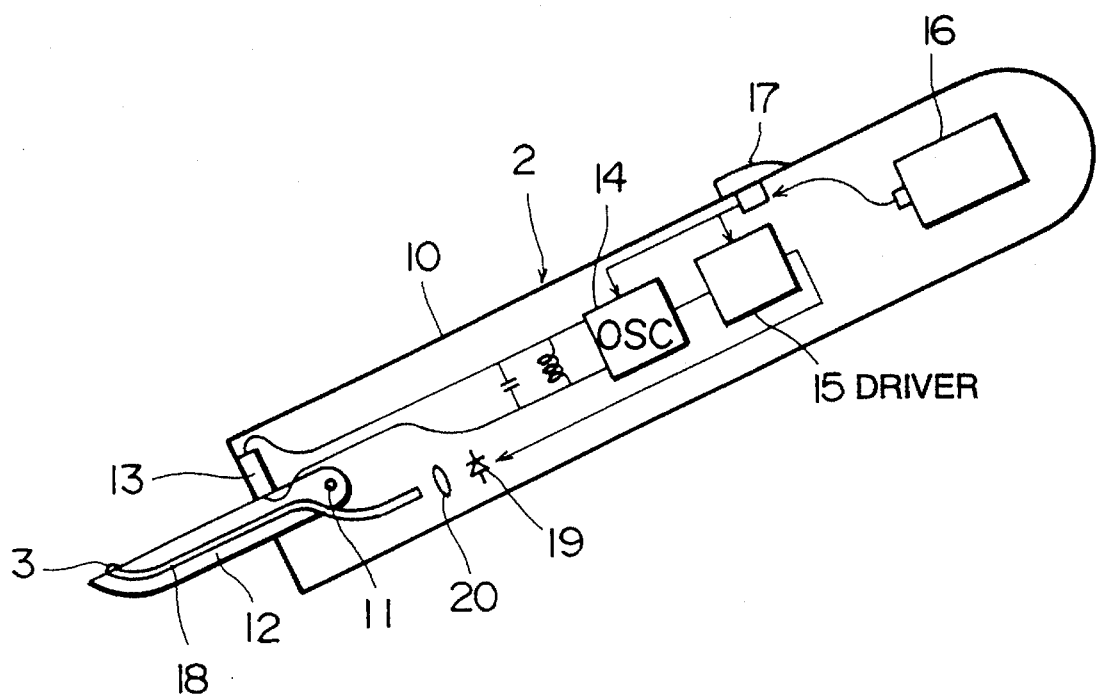
FIG. 2 is a section showing the internal structure of an optical pen type position pointer.

FIG. 1 is an external appearance perspective diagram showing the total configuration of an optical coordinate input unit according to a first embodiment of the present invention. In FIG. 1 the reference numeral 1 designates a cathode ray tube (CRT) as an example of a display unit. The CRT 1 is provided with a rectangular display screen 1a on its upper surface, for example. The display unit is not limited to the CRT, and a liquid crystal display unit may be used. The screen 1a of the CRT 1 is designed so that it functions as an output surface for displaying inputted data and other necessary information, and also as an input surface of the optical coordinate input unit. That is, a coordinate detecting unit having an input function and a display unit having an output function are united. On the display screen 1a as an input surface, for example, a pen type position pointer 2 is movably operated by an operator. As shown in FIG. 2, the pen type position pointer 2 has a point-like light source 3 (hereinafter referred to as "point light source") at its tip portion and is configured so as to be an optical pen type position pointer. The position of existence of the point light source 3 on the input surface is made equal to a position pointed by the position pointer 2. The point light source 3 may be a light source of being a point-like light-emitting portion for self-emitting light (a light-emitting source), or an indirect light source of receiving light from another light-emitting portion for emitting light (an optical output terminal portion of an optical fiber and the like).

Although the above description has been made upon the case where the input surface of the optical coordinate input unit and the screen of the display unit are united to form one unit, they do not need to be united as one unit. That is, the invention can be applied to the case where the input surface and the display screen are formed separately.

For example, at an upper corner of the rectangular display screen 1a, there is disposed a photodetector 4 for realizing an optical position detecting unit. The photodetector 4 is an optical position detector which includes one image pickup unit (for example, a CCD linear image sensor) and one light-receiving element as will be described later. The number of photodetectors 4 disposed in the vicinity of the display screen 1a to receive light emitted from the point light source 3 of the pen type position pointer 2 is only one. In the optical position detecting unit of this embodiment, the distance from the position pointed by the pen type position pointer 2 (the position of existence of the point light source 3) to the photodetector 4 (strictly speaking, the image pickup surface of the image pickup unit) can be obtained by using only one photodetector 4. The method of obtaining the distance will be described later in detail. Further, the direction of incidence of the light from the point light source 3 to the image pickup region (a pixel array region) of the image pickup unit can be obtained. Further, the coordinates of the position pointed by the position pointer 2 can be calculated on the basis of both the distance and the direction of incidence of the light which have been obtained. The theory for calculating the distance to the pointed position (coordinates) and the direction of incidence of light by using only one photodetector 4 will be described later in detail.

The optical coordinate input unit is configured by the optical position detecting unit (or an optical coordinate detecting unit as will be described later in detail with reference to FIG. 3) including the photodetector 4, and the pen type position pointer 2 (shown in FIG. 2) including the point light source 3. The optical position detecting unit receives the light emitted from the point light source 3 of the position pointer 2 and calculates coordinate information with respect to the position of existence of the point light source 3 on the basis of the received light.

The output signal of the optical position detector arranged in the CRT 1 is transmitted to an arithmetic operation and control unit 6 through an RS232C cable 5. The arithmetic operation and control unit 6 is configured by a personal computer, for example. The arithmetic operation and control unit 6 calculates distance data with respect to the position pointed by the optical position pointer 2 and data with respect to the direction of incidence of the light based on data generated from the signal detected by the photodetector 4. The data thus obtained are transmitted to the CRT 1 through a CRT cable 7 so as to display information of the pointed position on the display screen 1a.

FIG. 2 shows an example of the internal structure of the optical pen type position detector 2. Referring to FIG. 2, the structure of the position pointer 2 and an electric circuit contained in the position pointer 2 will be described below. The pen type position pointer 2 using light may be formed as a cordless position pointer. In FIG. 2 the reference numeral 10 designates a pen housing. A pen point portion 12 is attached to an end of the pen housing 10 so as to be rotatable around a fulcrum 11. The reference numeral 13 designates a writing pressure detector. When an arbitrary position is pointed while the pen point portion 12 is brought into contact with the input surface, the writing pressure detector 13 detects the contact pressure thereof. The writing pressure detector 13 made of a dielectric substance has a function of a variable-capacitance capacitor in which its capacitance can be changed by pressing. The point-like light source 3 is provided at an end of the pen point portion 12. The electric circuit including an oscillator (OSC) 14 and a driver circuit 15 and a battery 16 is provided in the inside of the pen housing 10. A side switch 17 is provided in the outside of the pen housing 10 so as to be exposed. In this embodiment, the point light source 3 is a top end of an optical fiber 18 so that light transmitted through the optical fiber 18 is emitted from the end of the optical fiber 18. When an operator turns on the side switch 17, electric power from the electric circuit is supplied to a light-emitting element 19 such as a light-emitting diode so that the light-emitting element 19 emits light. The light emitted by the light-emitting element 19 passes through optical components such as a lens 20 and the optical fiber 18, and is emitted out from the portion of the point light source 3. The side switch 17 is used for emitting light from the point light source 3. To operate the side switch 17 represents the operation of pointing out a specific position by the position pointer 2.

The oscillation frequency of the oscillator 14 in the electric circuit is modulated. The light emitted from the point light source 3 is modulated by the oscillation output of the oscillator 14 so that writing pressure information detected by the writing pressure detector 13 and information given by the side switch 17 can be delivered to the photodetector 4.

Figure 3:
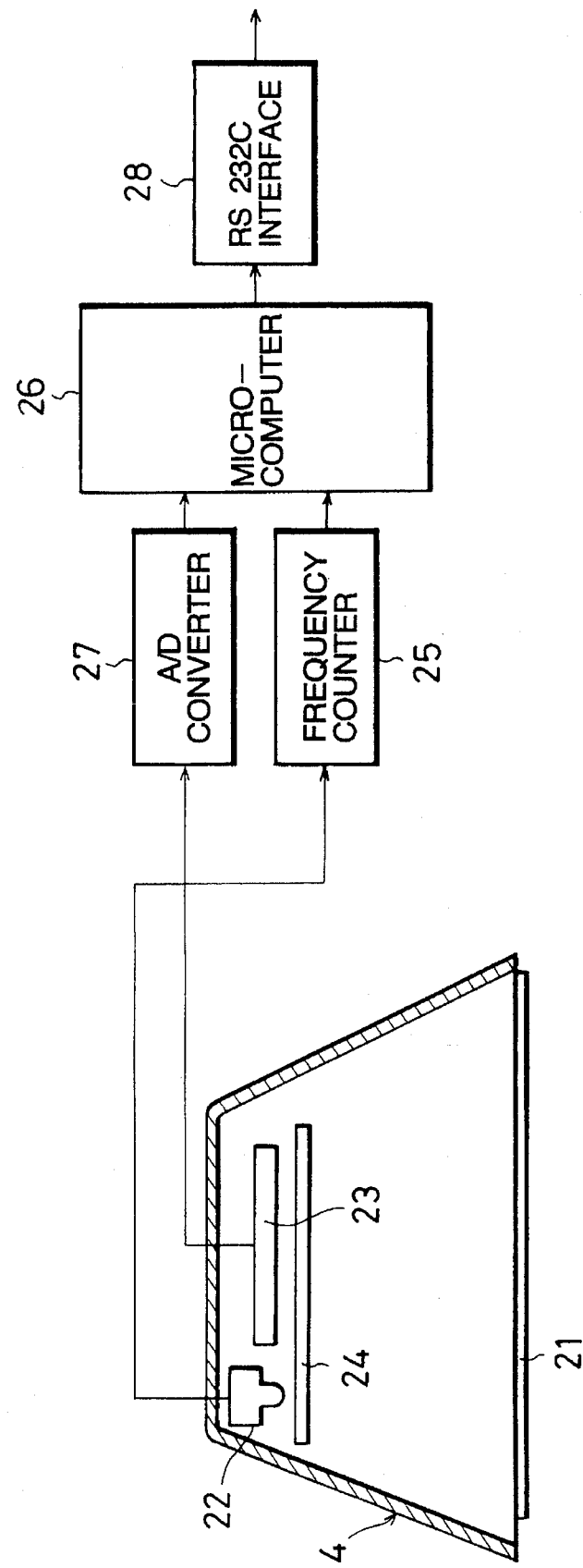
FIG. 3 is a diagram showing an embodiment of the optical position detecting unit.

FIG. 3 shows an example of the circuit structure of an optical position detecting unit including the photodetector 4. A light-transmission pattern plate 21 is disposed in the front of the photodetector 4. For example, a pattern formed by a plurality of lines arranged at regular intervals is drawn on the pattern plate 21 as will be described later. The distance between adjacent lines in the pattern is known in advance. A light-receiving element 22 and a CCD linear image sensor 23 are arranged side by side in the inside of the photodetector 4. A filter 24 is disposed in the front of the light-receiving element 22 and the CCD linear image sensor 23. The filter 24 has a wavelength selecting function so that only the light emitted from the point light source 3 of the position pointer 2 is allowed to pass. When, for example, an infrared light-emitting element is used as the light-emitting element 19, the filter 24 functions as an infrared light transmission filter. By this filter, background light other than the light emitted from the point light source 3 can be removed. The light-receiving element 22 is used for reading an operation signal contained in the light emitted from the point light source 3 whereas the CCD linear image sensor 23 is a one-dimensional sensor and used for inputting an image of the pattern projected onto the image pickup region (or light-receiving region) thereof. The "one-dimensional sensor" means a sensor having a large number of pixels arranged on a substantially straight line. Since microscopically the light-receiving portion of each pixel is shaped like a plane, the pixels are actually arranged to make an "image pickup surface". In addition, the image pickup region may be a pixel array region. The pixels are arranged so that the direction of their arrangement is coincident (parallel) with the direction of pattern isolation (the direction of pattern's lines arrangement) in which the equal-interval pattern is formed.

The signal outputted from the light-receiving element 22 is inputted to a frequency counter 25 which supplies a signal proportional to the frequency of the output signal to a microcomputer 26. The analog signal outputted from the CCD linear image sensor 23, which includes information with respect to the pattern, is converted into a digital signal on the basis of predetermined sampling timing in an analog/digital (A/D) converter 27 to supply the information of the pattern to the microcomputer 26. As will be described later, the microcomputer 26 calculates the position of the center of gravity used for determining the positions of the pattern lines on the basis of the signal with respect to the projected positions of the pattern lines detected in the respective pixels of the CCD linear image sensor 23. The data of the projected positions of the lines obtained in the respective pixels are supplied to the arithmetic operation and control unit 6 (FIG. 1) through an RS232C interface 28 and the RS232C cable 5. The arithmetic operation and control unit 6 calculates an enlargement ratio of the pattern of the pattern plate 21 on the image pickup surface by statistically processing the position data with respect to the pattern obtained in the respective pixels of the CCD linear image sensor 23, and further calculates the distance from the image pickup surface to the point pointed (FIG. 1) by the position pointer 2 by using the enlargement ratio.

Figure 4:
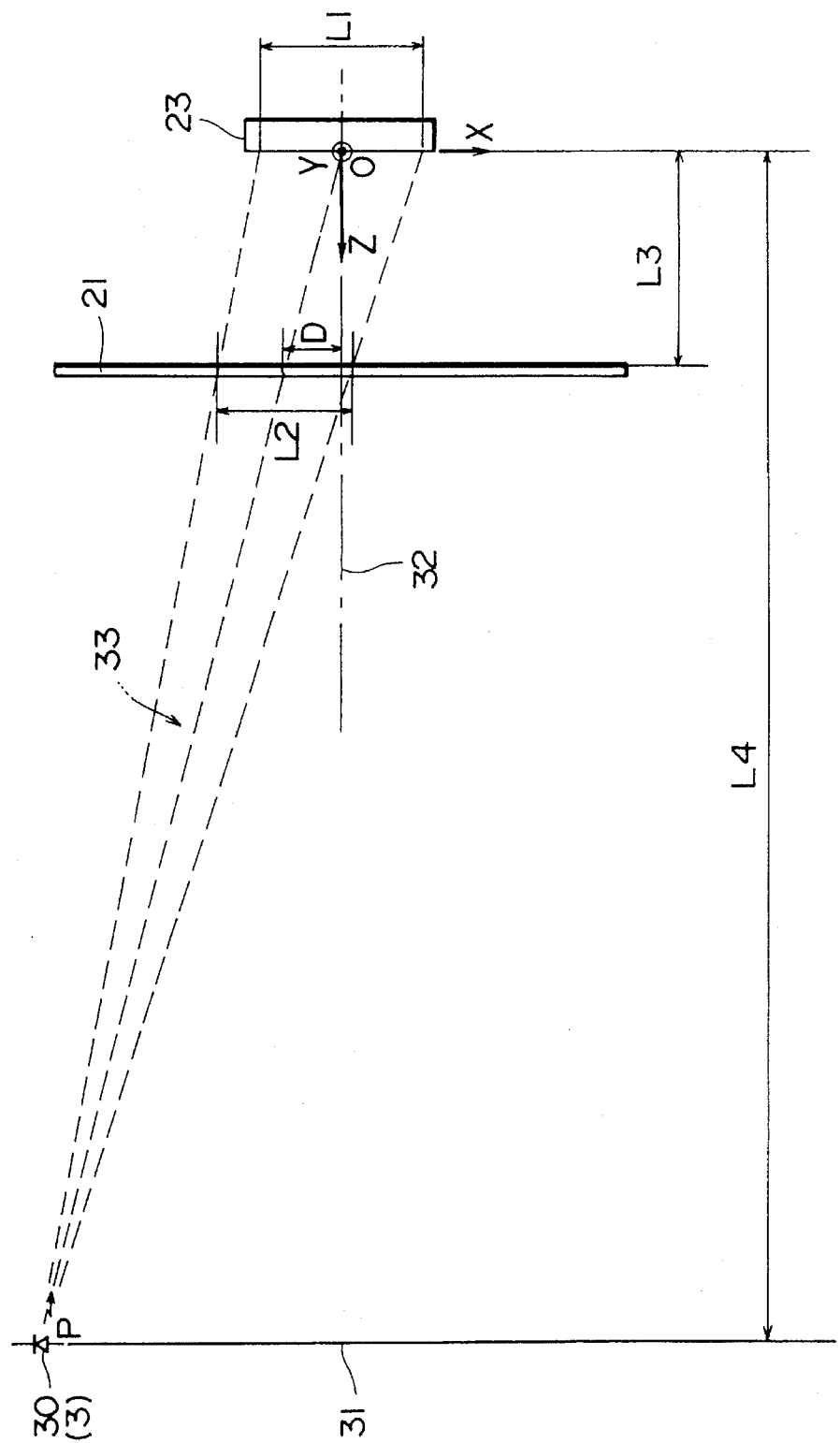
FIG. 4 is a diagram for explaining the theory of calculation of the distance to a point light source.
Figure 5:
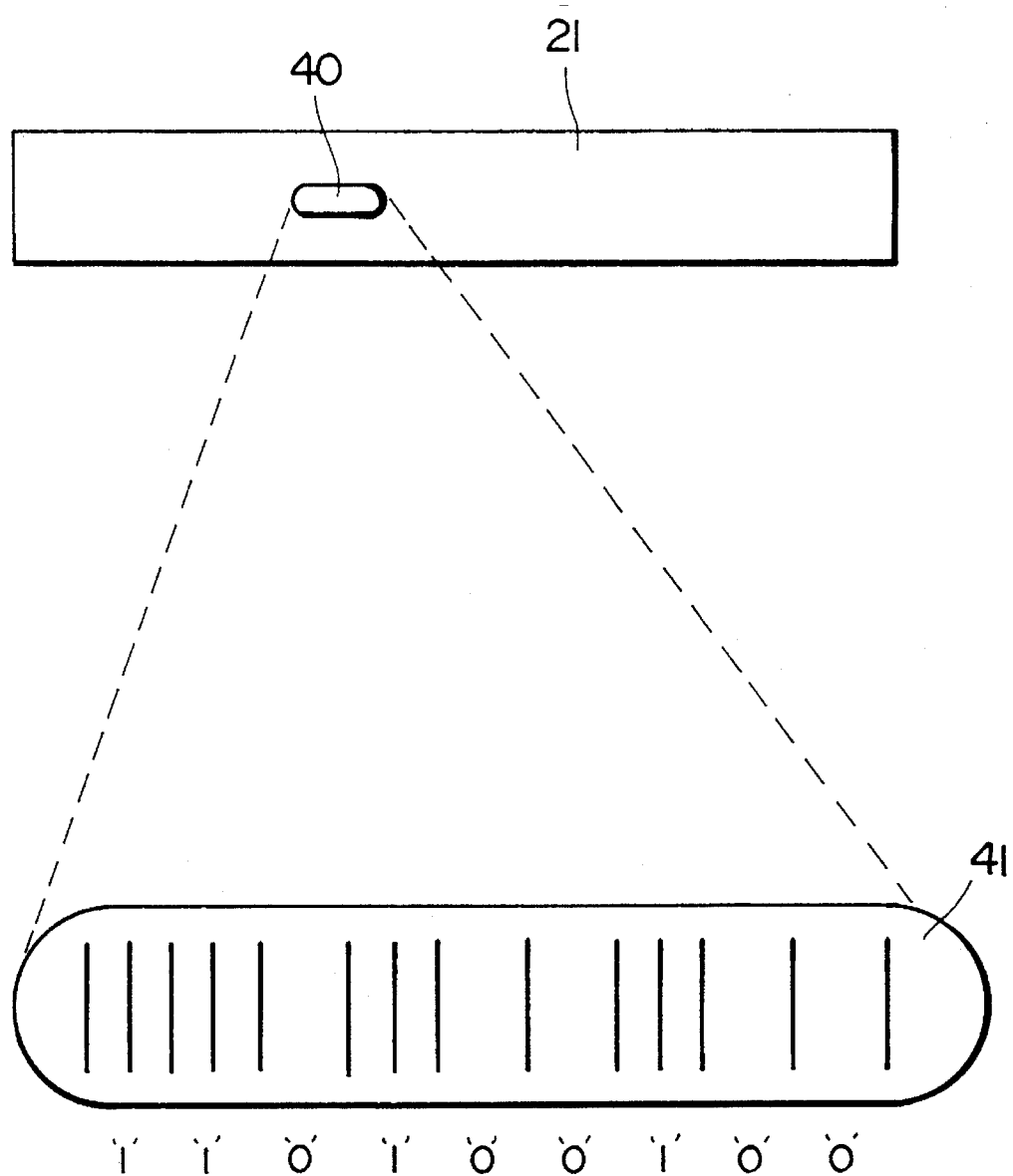
FIG. 5 is a diagram showing an embodiment of a pattern projected onto an image pickup surface of an image pickup unit.
Figure 6:
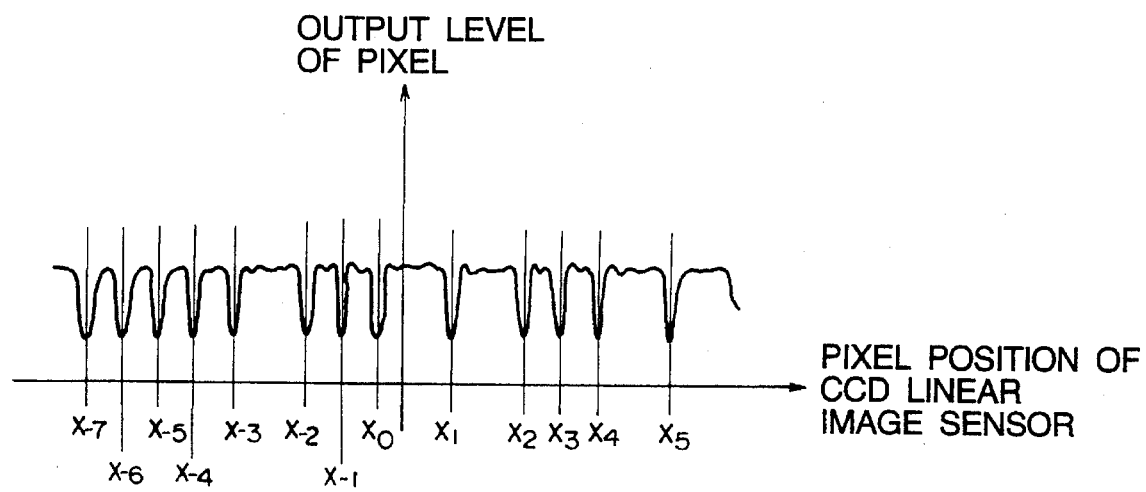
FIG. 6 is a waveform graph showing an example of the output signal of the image pickup unit.
Figure 7:
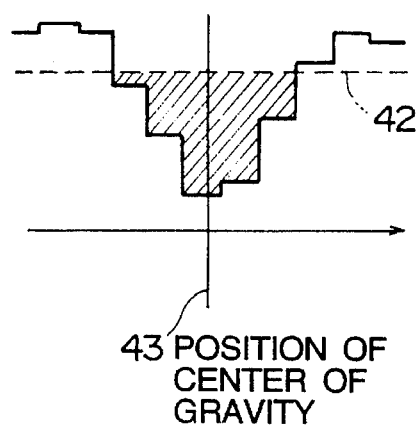
FIG. 7 is a diagram showing an embodiment of the method of obtaining the position of a line-projected portion.
Figure 8:
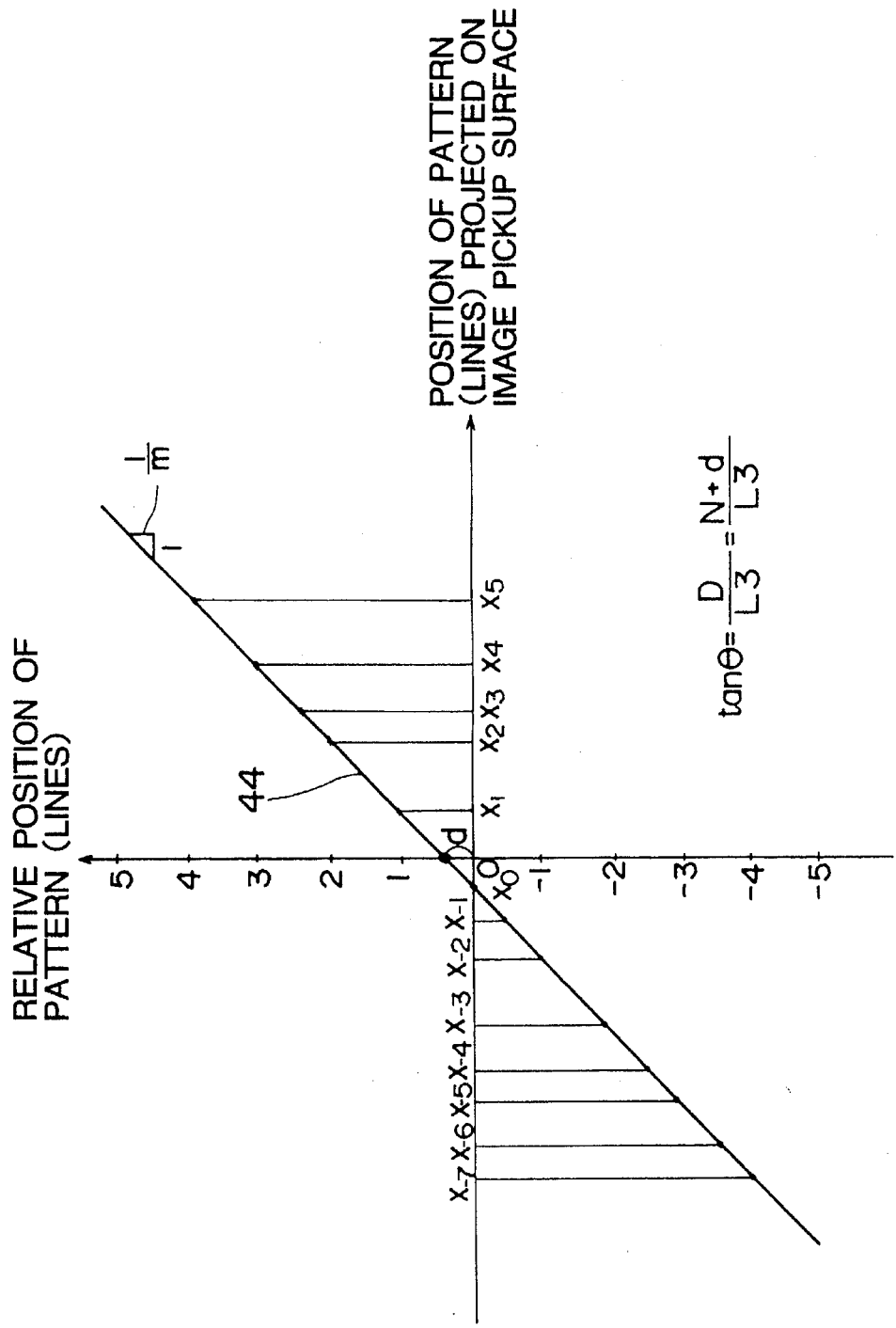
FIG. 8 is a graph for explaining the method of calculating an enlargement ratio and an angle of incidence of light.

Referring to FIGS. 4 through 8, the theory for calculating the distance from the image pickup surface of the CCD linear image sensor 23 to the point light source 3 of the position pointer 2 and the angle of incidence of light to the image pickup surface by using one photodetector 4 will be described. FIG. 4 is a diagram showing a geometrical relation for calculating the distance; FIG. 5 is a diagram showing an example of the pattern; FIG. 6 is a waveform chart showing a part of the output waveform of the CCD linear image sensor; FIG. 7 is a diagram for explaining the method of determining the center position (line position) of the pattern projected portion in the detected signal; and FIG. 8 is a graph showing a relation for calculating the enlargement ratio and the angle of incidence of light.

The terminology "distance to the point light source" used herein means the distance from the image pickup surface to the point light source in the direction of a normal line of the image pickup surface, that is, the Z ordinate of the position P of the point light source 3 in the case where the center of the image pickup surface is represented by point O and where the normal line of the image pickup surface with respect to the point O is represented by the Z axis. Further, the X axis is a coordinate axis set in the direction of arrangement of the pixels of the CCD linear image sensor with the point O as the origin, and the Y axis is a coordinate axis perpendicular to both of the X axis and the Z axis with the point O as the origin. In the case where the position detecting unit is configured as a two-dimensional digitizer, the terminology "angle of incidence of light" used herein means $\phi QOZ$ when the foot of the perpendicular from point P on a ZX plane is represented by point Q. In the case where the position detecting unit is configured as a three-dimensional digitizer, the terminology "angle of incidence of light" means a pair of $\angle QOZ$ and $\angle ROZ$ when the foot of the perpendicular from point P on a YZ plane is represented by point R. In the case of the three-dimensional digitizer, the two directions of arrangement of a grating pixel array forming a CCD area image sensor, which cross at right angles, are defined as the X axis and the Y axis respectively. When the image pickup surface of the CCD area image sensor is shaped like a regular square, the origin is set to an intersection of diagonals thereof.

The calculation of the distance from the photodetector 4 to the point light source 3 is performed by making use of the pattern image of the pattern plate 21 projected onto the image pickup surface of the CCD linear image sensor 23. Strictly speaking, the distance from the image pickup surface of the CCD linear image sensor 23 to a line containing the point light source 3 of the position pointer 2 and parallel to the image pickup surface, that is, the aforementioned Z ordinate is calculated.

In FIG. 4 the reference numeral 30 designates the point light source 3 of the optical pen type position pointer 2, 21 the pattern plate and 23 the CCD linear image sensor. The reference numeral 31 designates a line containing the position 30 of the point light source 3 and parallel to the image pickup surface of the CCD linear image sensor 23. The alternate long and short dash line 32 is a center line common to the pattern plate 21 and the CCD linear image sensor 23. The broken line 33 shows the state of advance of light incident to the CCD linear image sensor 23. The light 33 emitted from the point light source 3 passes through the pattern plate 21 to be incident to the image pickup surface of the CCD linear image sensor 23. The angle ∠QOZ, that is, the angle between a segment QO obtained by projecting a segment PO onto a ZX plane and the Z axis is represented by θ. In this occasion, a part of the pattern drawn on the pattern plate 21 is projected onto the image pickup surface of the CCD linear image sensor 23. As shown in FIG. 4, sizes L1, L2, L3 and L4 are defined. L1 represents the transverse length (length in the direction of arrangement of the pixel array) of the pattern projected region on the image pickup surface of the CCD linear image sensor 23, L2 represents the transverse length of the transmission region of the light 33 in the pattern plate 21, L3 represents the distance between the pattern plate 21 and the CCD linear image sensor 23, and L4 represents the distance between the line 31 and the image pickup surface of the CCD linear image sensor 23. With respect to the sizes L1 through L4, the relation L4: L1=(L4-L3): L2 holds based on the geometrical relation therebetween. If L1/L2 which is equivalent to the enlargement ratio of the pattern is now replaced by m, L4 is given by the equation $\{m/(m-1)\} \times L3$. Because the distance L3 used in this equation is known, the distance L4, or, the Z ordinate of the point P can be calculated if the enlargement ratio m is calculated. As will be described later, the pattern provided on the pattern plate 21 is preferably a pattern of lines which has equal interval characteristic so that the direction of isolation thereof is coincident with the direction of arrangement of the pixel array of the CCD linear image sensor 23. More preferably, the pattern is constituted by a pattern of segments drawn perpendicularly to the direction of isolation thereof. Accordingly, even in the case where the point P is slightly above the ZX plane, that is, even in the case where the segment PQ has a certain measure of size, the image of the same pattern as the case where the point P is on the XZ plane can be formed on the image pickup surface of the CCD linear image sensor 23.

In the case where a CCD linear image sensor having 2048 pixels arranged at intervals of a pitch of 14 μm is used, L4 is 268.33 mm when L1 is 23 mm under the conditions of L3=35 mm and L2=20 mm. When L1 is 23.014 mm, L4 is 267.25 mm. In this case, distance resolution of about 1 mm per pixel is obtained.

The enlargement ratio m is calculated as follows. First, an example of the pattern used is shown in FIG. 5. A part 40 of the pattern drawn on the pattern plate 21 is expressed as an enlarged pattern 41 on the image pickup surface of the CCD linear image sensor 23. The pattern is expressed by a plurality of lines arranged at regular intervals. With respect to the intermediate place between two adjacent lines among the plurality of lines, a line is present in a position corresponding to the digital code "1" and a blank portion is formed in the position corresponding to the digital code "0". The arrangement of codes "1" and "0" forms an M-sequence (Maximum length sequence, M period sequence) code arrangement. The terminology "M-sequence" used herein means a code arrangement which is widely used in the field of communication technique or the like. For example, an M-sequence based on 6 bits has such characteristic that the position of existence of a code of constituted by continuous 6 digits is determined uniquely on the pattern when the code of 6 digits is picked out arbitrarily. Each of the pixels arranged on the image pickup surface of the CCD linear image sensor 23 detects the intensity of light generated by the part 40 of the pattern. FIG. 6 shows an example of the waveform of a signal outputted from the CCD linear image sensor 23. In FIG. 6, the abscissa represents the position of each pixel in the CCD linear image sensor 23, and the ordinate represents the output level (light-receiving intensity signal) of each pixel. Among the output levels, levels lower in signal intensity represent places to which the line portions of the pattern are projected respectively, and levels higher in signal intensity represent places to which the other portions are projected respectively. In the respective pixels of the CCD linear image sensor 23, the places to which the line portions of the pattern are projected come to be shadows. In order to obtain the positions of projection of lines of the pattern, it is necessary to obtain the respective center positions of the shadows. FIG. 7 shows a method of obtaining the center position of each shadow. In this method, after a threshold level 42 is set for the output waveform of each pixel in the CCD linear image sensor 23, the center-of-gravity position 43 of a portion having a lower signal level than the threshold level is obtained. The center-of-gravity position is determined as the position of existence of each line in the pattern. In this case, the center-of-gravity position becomes equal to the center position of the shadow, and the center position of the shadow becomes equal to the position of projection of the line.

Another method of obtaining the center position of projection of the line is the method of obtaining a position by which the area of the shadow shown in FIG. 7 is just divided into two as the position of a segment.

The positions $x_0, x_1$ to $x_5, \ldots, x_{-1}$ to $x_{-7}, \ldots$ of projected lines of the pattern detected in the plurality of pixels respectively are obtained on the basis of the pattern portion projected onto the CCD linear image sensor 23. Determining the center-of-gravity positions as the projected positions of the pattern necessarily makes the interpolation of the reciprocal of the divisor performed. As a result, accuracy in distance measurement is improved. That is, the resolution of the X ordinate can be improved so as to be finer than the pitch between adjacent pixels in the CCD linear image sensor.

The pattern on the pattern member 21 has equal interval characteristic based on the distance between adjacent lines in the pattern and has M-sequence characteristic based on the presence or absence of lines between the lines arranged at regular intervals, that is, based on the aforementioned discrimination between "1" and "0".

The enlargement ratio m is calculated by using pattern position data obtained on the basis of the pattern projected onto the CCD linear image sensor 23. FIG. 8 is a graph showing an example of calculating the enlargement ratio m. In FIG. 8, the abscissa represents the position of the lines in the pattern projected onto the image pickup surface of the CCD linear image sensor 23, and the ordinate represents the relative position of the lines. The "relative position" implies a concept which is defined on the basis of the fact that the pattern projected onto the center portion of the CCD linear image sensor 23 is a part of the pattern plate 21 and changeable dynamically in accordance with the change of the position of the point light source 3. The relative position is defined with an equal interval pitch as one unit based on the fact that the pattern in the pattern plate 21 is formed by the lines arranged at regular intervals. The graph is designed so that the calculation of the enlargement ratio or the like can be easily visually understood. That is, the graph does not show the fact that the CCD linear image sensor 23 and the pattern plate 21 are arranged at right angles spatially. The CCD linear image sensor 23 and the pattern plate 21 are arranged so as to be parallel to each other, that is, they are arranged so that the direction of arrangement of the pixel array of the CCD linear image sensor 23 is coincident with the direction of isolation of the pattern of the pattern plate 21.

In FIG. 8, the origin O in the abscissa is the position of the center point of the CCD linear image sensor 23. The abscissa coincides with the X axis. In the vicinity of the origin O which is the center point of the CCD linear image sensor 23, a part of the equal interval pattern of the pattern plate 21 is projected. Of points in the vicinity of the origin O, a point being in the negative region with respect to the X axis and nearest to the origin O, that is, the position $x_0$ of projection of a line of the pattern is determined as a position where the relative position is zero. The determination of the position of $x_0$ will be understood intuitively by referring to FIG. 6. When the determination of the position is to be performed by processing of a computer with respect to an equal interval pattern containing an M-sequence code system, pre-processing of extracting the equal interval pattern is required. For example, the pre-processing is carried out as follows.

In the case of a 6-bit M-sequence code system whose M-sequence is configured by using six bits, the maximum number of continuous codes of "1" on the pattern is six. If the number is not smaller than seven, the position cannot be determined uniquely because the number of sequences of six continuous codes each having the value of "1" is not smaller than two. Accordingly, when the shadows of equal interval pattern lines provided in opposite sides of each of the shadows of lines forming the single, sequence are considered in addition, the shadows of thirteen lines may be arranged at intervals of a half of the equal interval pitch. Conversely speaking, when the shadows of fourteen continuous lines are detected, there is at least one place where the shadows of lines are isolated at the equal interval pitch of the equal interval pattern, that is, there is at least one place where the bit of "0" is formed in the M-sequence code system.

Accordingly, the computer first detects the positions of fourteen continuous line shadows and calculates the isolation distances between the respective line shadows. The detection of the positions of fourteen continuous line shadows is applied to the case of a 6-bit M-sequence code system. In the case of a 7-bit M-sequence code system, the positions of sixteen continuous line shadows are detected. In the case of an 8-bit M-sequence code system, the positions of eighteen continuous line shadows are detected. Then, while the fact that the isolation distances thus obtained are roughly classified into two groups and that the distance in the larger distance group is about twice as much as the distance in the smaller distance group is confirmed, the distance in the larger distance group is acquired as the pitch of the equal interval pattern. Then, referring to line shadows at opposite ends of the pitch, the positions of line shadows arranged in the plus side and the minus side respectively from the reference line shadows and substantially at intervals of the pitch are acquired successively. Of the positions thus acquired, the position being in the negative side of the X axis and nearest to the origin is defined as $x_0$.

Because the pitch of the equal interval pattern used herein is used for convenience sake to acquire line shadows of the equal interval pattern, the pitch is not always equal to the pitch of the pattern on the pattern member 21.

The relative positions 1, 2, 3 and 4 of the pattern are plotted so as to be given to the thus extracted line shadows expressing the equal interval pattern, that is, to $x_1, x_2, x_4$ and $x_5$ in FIG. 8, respectively. Further, the relative positions −1, −2, −3 and −4 are plotted so as to be given to $x_{-2}, x_{-3}, x_{-5}$ and $x_{-7}$ in FIG. 8, respectively. The relative position O is plotted so as to be given to $x_0$.

Further, half-pitch relative positions such as 2.5, −0.5, etc. can be plotted so as to be given to line shadows which are different from the line shadows of the equal interval pattern and express the M-sequence pattern of "1". FIG. 8 shows this case.

When the positions of line shadows calculated as center-of-gravity positions are plotted in the abscissa of the graph shown in FIG. 8 and at the same time points are plotted on the basis of the relations between the positions in the abscissa and corresponding positions in the ordinate, a straight line 44 can be determined by application of the method of least squares. Because the slope of the straight line 44 thus obtained is given as 1/m by using the enlargement ratio m, the enlargement ratio m can be obtained by calculating the slope. By such statistical processing and the calculation of the center-of-gravity positions, interpolation of the order of 1/10 can be performed at the least. In the aforementioned case, the distance L4 can be obtained with accuracy of about 0.1 mm at the least. Although the fact that plotting of points and calculation of the slope of the straight line are performed has been expressed by using FIG. 8 for convenience sake, the enlargement ratio m is calculated by the method of least squares in accordance with a predetermined procedure from the point of view of computer processing.

As described above, the arithmetic operation for calculating the center-of-gravity positions to obtain each position of the projected portions of the pattern lines is carried out by the microcomputer 26, and the arithmetic operation for calculating the enlargement ratio m and the distance L4 is carried out by the arithmetic operation and control unit 6. However, all of the calculations may be carried out by either the microcomputer 26 or the arithmetic operation and control unit 6. The use of a pattern having equal interval characteristic is required in order to increase accuracy in the calculation of the enlargement ratio m by using statistical processing. If high accuracy is not required, the distance can be obtained easily only by using a pattern having lines arranged at known intervals.

Because the thus obtained data of the distance L4 has a relation to the position pointed by the position pointer 2, that is, because the data is quite equivalent to the Z ordinate, the coordinates of the pointed position can be obtained by using this distance data. The information with respect to the coordinate data is transferred from the arithmetic operation and control unit 6 to the CRT display unit 1 through the CRT cable 7, so that necessary information is displayed on the display screen 1a.

In the aforementioned embodiment, the pattern member is used without special use of any optical system such as a lens, so that not only simplification in structure and reduction in cost can be attained but a wide visual field angle can be obtained. Although the visual field angle in the case of using a lens or a single slit strongly depends on the size L1 of the image-pickup surface, the visual field angle in this embodiment strongly depends on the size of the pattern but little depends on the size L1. Accordingly, a wide visual field angle can be secured easily in the embodiment. Further, since the distance to the pointed position can be obtained by only using a single photodetector, simplification in structure and reduction in producing cost can be achieved. From the point of view of improving measurement accuracy, this embodiment is configured so that the enlargement ratio and the distance are calculated by statistically processing the signals detected by the plurality of pixels of the CCD linear image sensor 23. In addition, because a high resolution CCD linear image sensor at a relatively low price is available in the present technical situation, the structure using one high resolution CCD linear image sensor is more economical than the structure using two light beam direction detectors, that is, the structure using two low resolution CCD linear image sensors.

The angle of incidence of the light 33, that is, the angle $\theta$ between the center line of the light 33 and the image pickup surface of the CCD linear image sensor 23 is given by the equation $\tan\theta=D/L3$ in which D represents the X ordinate of the intersection of the line connecting the point light source 3 and the center O of the CCD linear image sensor 23 and the pattern plate 21 as shown in FIG. 4. The X axis is formed in the same manner as described above. The angle of incidence of light from the point light source 3 can be obtained through the value D calculated on the basis of M-sequence characteristic given to the pattern. The information with respect to the angle of incidence of light (the direction of incidence of light) is used for calculating the coordinate data. This is because the X ordinate of the point light source P is obtained as $X=Z \bullet \tan\theta$. The angle $\theta$ of incidence of light is obtained as follows. The information with respect to the center-of-gravity positions of the respective line shadows as shown in FIG. 6 and the information of equal interval line shadows obtained by the equal interval pattern extracting process carried out as the pre-processing for the calculation of the enlargement ratio m are acquired. A necessary number of bits (for example, six bits) are picked up in the vicinity of the center of the CCD linear image sensor so that bit "1" is given when a line shadow lies between adjacent equal interval line shadows, and bit "0" is given when no line shadow lies between adjacent equal interval line shadows. Thus, a digital code is obtained. Because this code is a partial code indicating the position of M-sequence, this code is converted into discrete coordinates N by table conversion. The discrete coordinates N are coordinates which are determined uniquely by a predetermined number of continuous bits, for example, by a set of six bits, in accordance with the M-sequence characteristic. Because the coordinates take discrete values in accordance with the pitch of the pattern drawn on the pattern plate 21, the coordinates are discrete coordinates. On the contrary, more delicate coordinates are required for determination of D. When a value to be interpolated, that is, a value (D-N) is considered, it will be understood that this value is just equivalent to the intercept d of the straight line obtained in FIG. 8. Accordingly, the relation $D=N+d$ is formed. On the basis of this relation, the angle of incidence is given by the equation $\tan\theta=(N+d)/L3$. Because the intercept d can be obtained by the method of least squares, the angle of incidence of light can be obtained with very high accuracy.

In the aforementioned embodiment, not only the Z coordinate of the position P of the point light source 3 can be calculated by the enlargement ratio m but the X coordinate of the position P of the point light source 3 can be calculated as $X=Z \bullet \tan\theta$ by both of the intercept d and the table conversion of the M-sequence digital code. This fact means that a two-dimensional digitizer for detecting the momentarily changed position of the point light source 3 which moves on the XZ plane or in the proximity thereof can be realized by using one CCD linear image sensor (one-dimensional image sensor).

The theory of the two-dimensional digitizer can be extended to a three-dimensional digitizer, when the Y axis is set as described above; the CCD linear image sensor is replaced by a CCD area image sensor; and the pattern plate 21 is replaced by a pattern plate having the aforementioned characteristic in both directions of the X axis and the Y axis.

Figure 9:
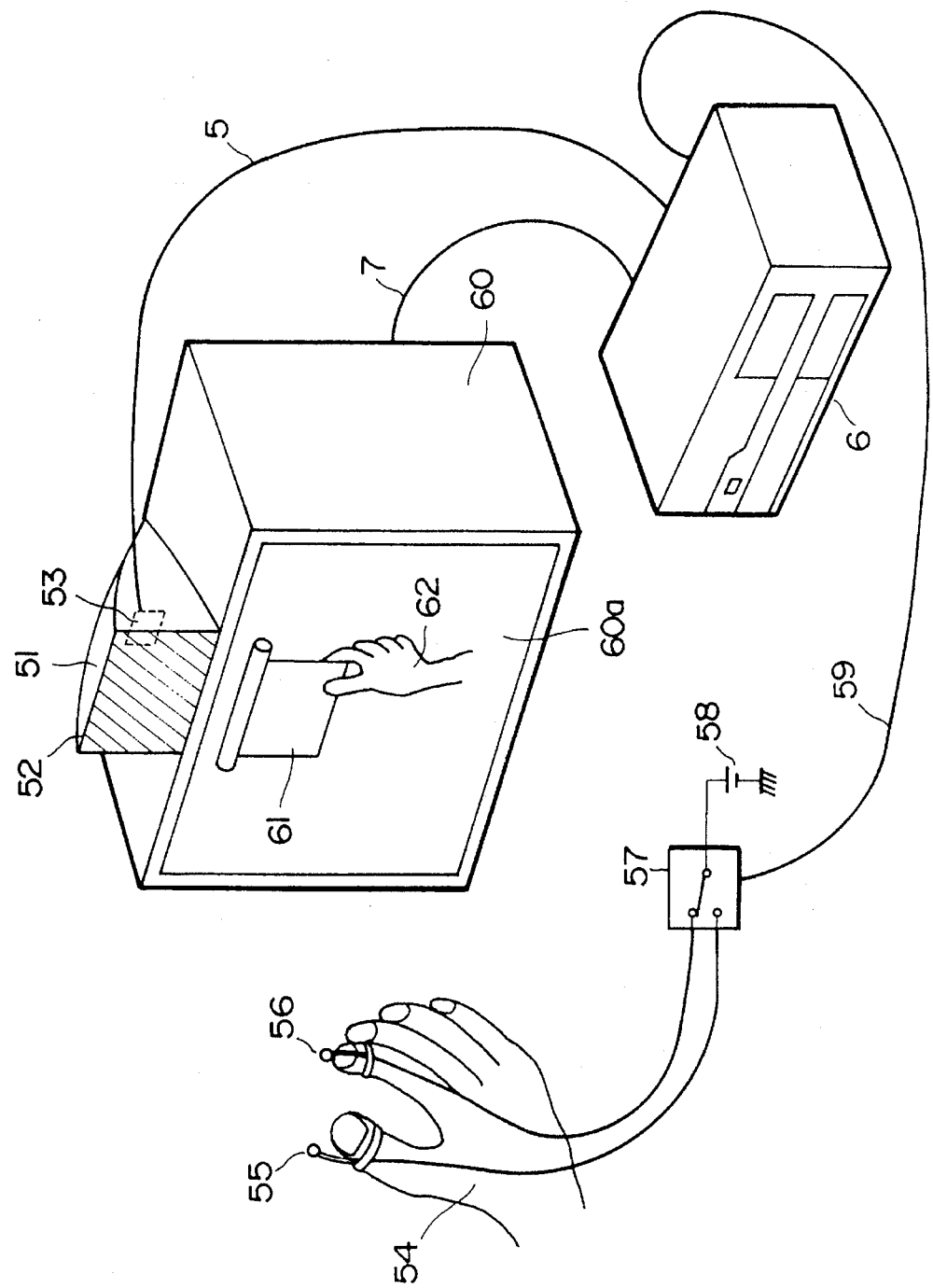
FIG. 9 is a system diagram for explaining an applied example of a three-dimensional optical coordinate input unit using a CCD area image sensor.

FIG. 9 shows another embodiment of the present invention. According to this embodiment, three-dimensional digitizer can be realized by using the CCD area image sensor and interaction between the real action of a human being and the existing substance displayed on the screen of the display unit can be made. In FIG. 9 the reference numeral 51 designates a photodetector. A pattern plate 52 is attached to the front portion of the photodetector 51. A CCD area image sensor 53 is disposed in the inside of the photodetector 51. The light-receiving element and the other signal processing circuit as shown in FIG. 3 are provided if needed, but they are not shown in FIG. 9 for simplification of explanation. The output signal from the photodetector 51 is supplied to the arithmetic operation and control unit 6 through the RS232C cable 5. On the other hand, there are used point light sources 55 and 56 which are not formed as optical pen type position pointers but formed so as to be respectively attached to the thumb and first finger of a human hand 54. The point light sources 55 and 56 are configured by light-emitting diodes respectively. The point light sources 55 and 56 are formed so as to be supplied with light-emission electric power from an electric source 58 through a switch 57. The switching operation of the switch 57 is carried out on the basis of a signal given from the arithmetic operation and control unit 6 through a switching control cable 59. When light is emitted from the point light sources 55 and 56 supplied with electric power from the electric source 58 through the switch 57, the light radiated from the point light sources 55 and 56 is detected by the photodetector 51 so that the coordinates in three-dimensional space can be obtained on the basis of the aforementioned distance detecting theory.

Figure 10:
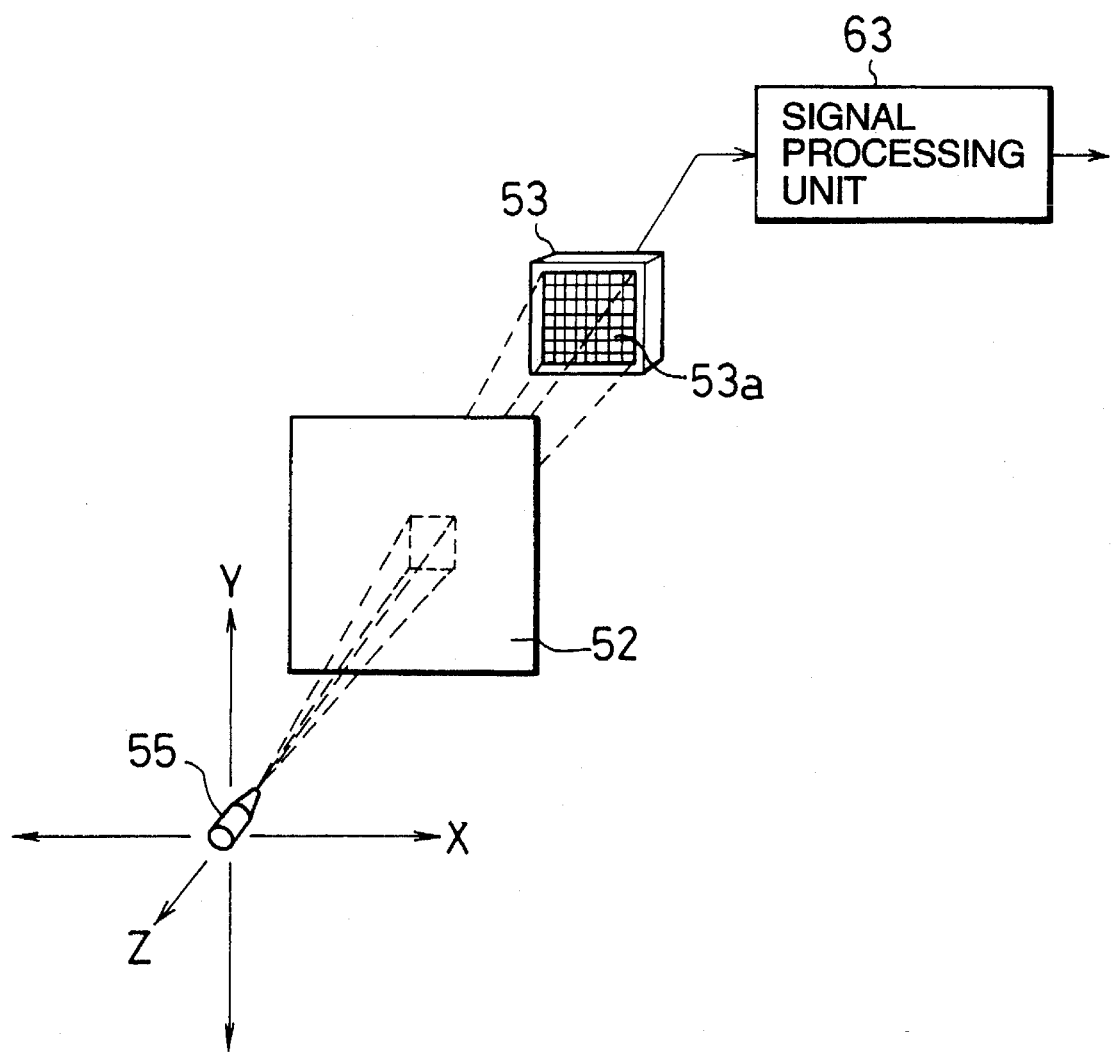
FIG. 10 is a diagram showing the important part of the applied example.

FIG. 10 shows the structure of important part of the three-dimensional digitizer. In FIG. 10 the reference numeral 55 designates the point light source, 53 the CCD area image sensor and 53a an image pickup surface configured by CCD pixels. A pattern plate 52 is disposed between the point light source 55 and the CCD area image sensor 53. The effect obtained by the pattern plate 52 is the same as in the case of the previous embodiment. Signals detected by the respective pixels of the CCD area image sensor 53 are delivered to a signal processing unit 63 which carries out an arithmetic operation. An M-sequence pattern extended to two dimensions as will be described later is drawn on the pattern plate 52.

When the position of the point light source 55 is changed, the shadow of a part of the M-sequence pattern corresponding to the position of the point light source 55 in the pattern plate 52 is projected onto the image pickup surface 53a of the CCD area image sensor 53. The shadow of the M-sequence pattern projected onto the image pickup surface 53a is determined uniquely in accordance with the position of the point light source 55. Accordingly, signals detected by the pixels of the CCD area image sensor 53 are read out and then the pattern at the shadow portion of the M-sequence pattern is obtained by carrying out an arithmetic operation in the longitudinal and transverse directions of the M-sequence pattern individually. In the arithmetic operation, the procedure for the arithmetic operation described in the previous embodiment is carried out so that the position of the point light source 55 can be obtained. The position of the other point light source 56 can be obtained in the same manner as described above.

In FIG. 9, the reference numeral 60 designates a CRT display unit. Assume now that, for example, a sheet 61 and a human hand 62 which is pulling down the sheet 61 are displayed on the screen 60a of the CRT display unit 60. Such displaying is performed on the basis of the information processing and displaying functions of the arithmetic operation and control unit 6. The display is formed so that the hand 62 on the screen 60a has an interlocking relation to a real hand 54. That is, the position and motion of the hand 62 on the screen 60a are interlocked with those of the real hand 54. The respective positions of the point light sources 55 and 56 attached to the real hand 54 are detected by the photodetector 51 to thereby obtain the respective coordinates thereof and then the obtained coordinate data are converted into display data and displayed on the screen 60a. By interlocking the real hand 54 and the hand 62 displayed on the display screen, the operation of pulling the sheet 61 with the hand 62 on the display screen virtually can be made.

Figure 11:
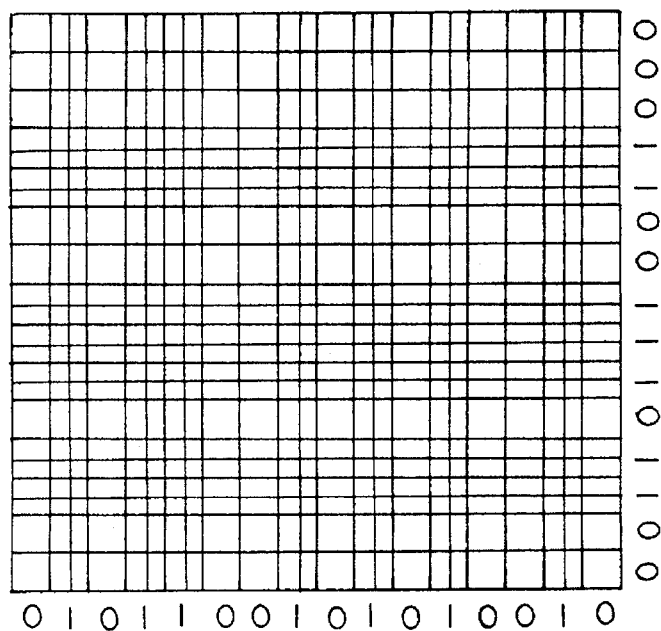
FIG. 11 is a view showing an example of a two-dimensional pattern.
Figure 12:
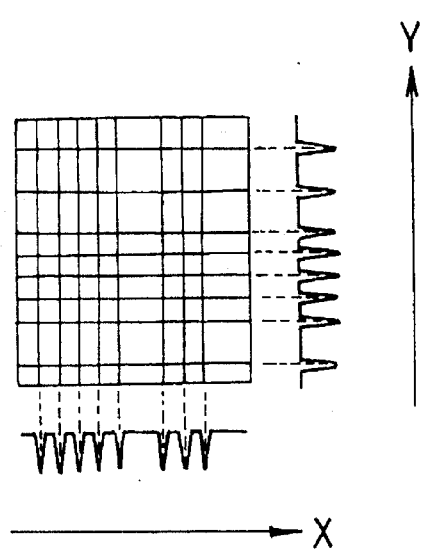
FIG. 12 is a diagram for explaining the processing of a two-dimensional pattern detected signal.

FIG. 11 shows an example of the pattern projected onto the CCD area image sensor 53. This pattern shows the case where the pattern as described above in the first embodiment is formed in the directions of two axes perpendicular to each other in a regular square region. Two kinds of bits "1" and "0" in an M-sequence code system are expressed by the presence and absence of intermediate lines between lines arranged at equal intervals. In the CCD area image sensor 53, image signal as shown in FIG. 12 is obtained by projection of the pattern shown in FIG. 11 and then information with respect to the axes perpendicular to each other is removed by integrating values of pixel signals in the directions of the X and Y axes individually so that the pixel signals can be converted into the same signal as in the first embodiment. Because signals with respect to the respective directions are integrated by this processing, the signal-to-noise ratio (S/N ratio) is improved so that weaker light can be detected. By applying the same processing as in the first embodiment to the signal after the conversion, distance data and coordinate data on a two-dimensional coordinate plane are calculated.

Figures 13A, 13B:
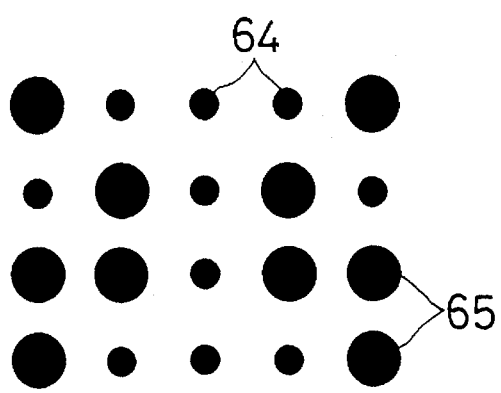
FIGS. 13A and 13B are views showing another example of the two-dimensional pattern having M-plane characteristic.

FIGS. 13A and 13B show another example of the pattern. As shown in FIG. 13A, this pattern is a two-dimensional system called "M-plane". The pattern is a digitally coded dot pattern which is constituted by delicate small-size dots 64 and large-size dots 65 so that the two-dimensional position of each dot can be defined uniquely from a two-dimensional partial code. For example, a matrix of 3-bit rows and 3-bit columns, that is, a combination of 9 bits determines a unique position (discrete coordinates indicating a pair of X and Y coordinated on the pattern in the case of the aforementioned coordinate axes) in the whole pattern. This pattern has a numerical meaning as shown in FIG. 13B. The position of grating points corresponding to the positions of the respective dots form a portion having the characteristic of the equal interval. The M-plane has been described in detail in "Coding Theory" pp. 474–499, written by Hiroshi Miyagawa, Yoshihiro Iwadare and Hideki Imai and issued by Shokado, 1973.

In the aforementioned embodiment, the respective centers of gravity of the dots projected onto the image pickup surface are obtained and then the enlargement ratio of the distance between the dots and two-dimensional displacement values with respect to the pattern are obtained to thereby obtain the three-dimensional coordinates of the light-emitting source. More in detail, the aforementioned discrete coordinates N are obtained as a pair of (Nx, Ny) from the M-plane digital code by table conversion whereas the calculation of (dx, dy) as an interpolating value is performed by carrying out the procedure of obtaining dx and dy in the directions of the X and Y axes individually after the procedure of calculating the respective two-dimensional center-of-gravity positions of the dots. As for the enlargement ratio m, respective enlargement ratios mx and my in the directions of the X and Y axes can be calculated, so that a procedure of using the arithmetical or geometrical mean of the two enlargement ratios as m is carried out. The distance to the point light source is obtained on the basis of the enlargement ratio, and then the X and Y coordinates of the intersection of the light beam direction and the pattern plate are obtained on the basis of the M-plane code and the information of two intercepts to thereby determine the three-dimensional coordinates of the position of the point light source.

Figure 14:
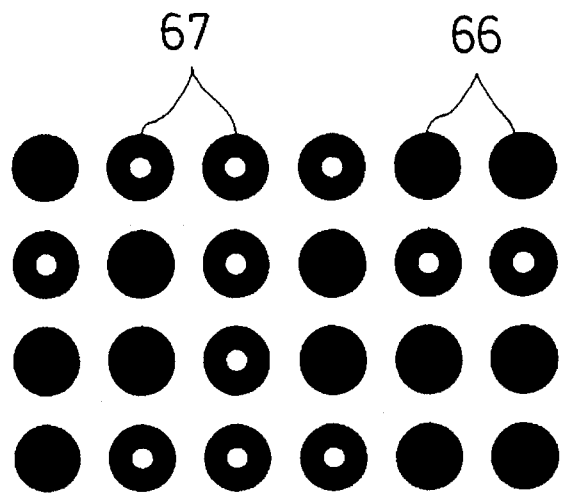
FIG. 14 is a view showing another example of the M-plane.

FIG. 14 shows another example of the M-plane. In this M-plane, solid black dots (the same as the large-sized dots 66) and ring-like black dots 67 are arranged in M-plane order. Compared with the M-plane in FIG. 13A, this M-plane is different in that ring-like dots 67 are used instead of the small-size dots 64. The shape of the ring is not limited to the circular shape.

Figure 15:
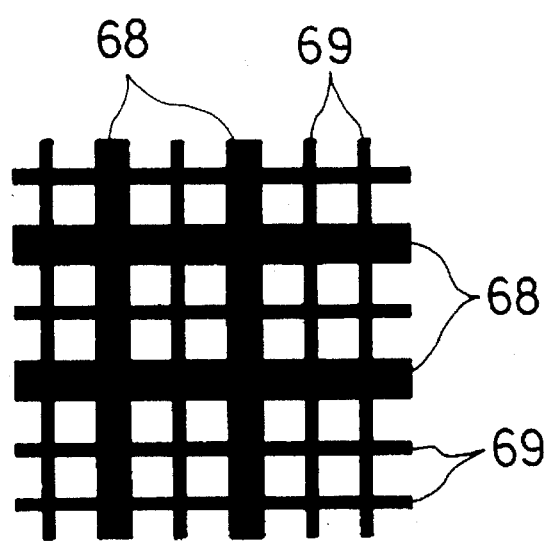
FIG. 15 is a view showing another example of the M-plane.

FIG. 15 shows another example of the two-dimensional M-sequence pattern. As shown in FIG. 15, the M-sequence pattern is drawn by using thick lines 68 and thin lines 69 in combination in the longitudinal and transverse directions respectively.

Figure 16:
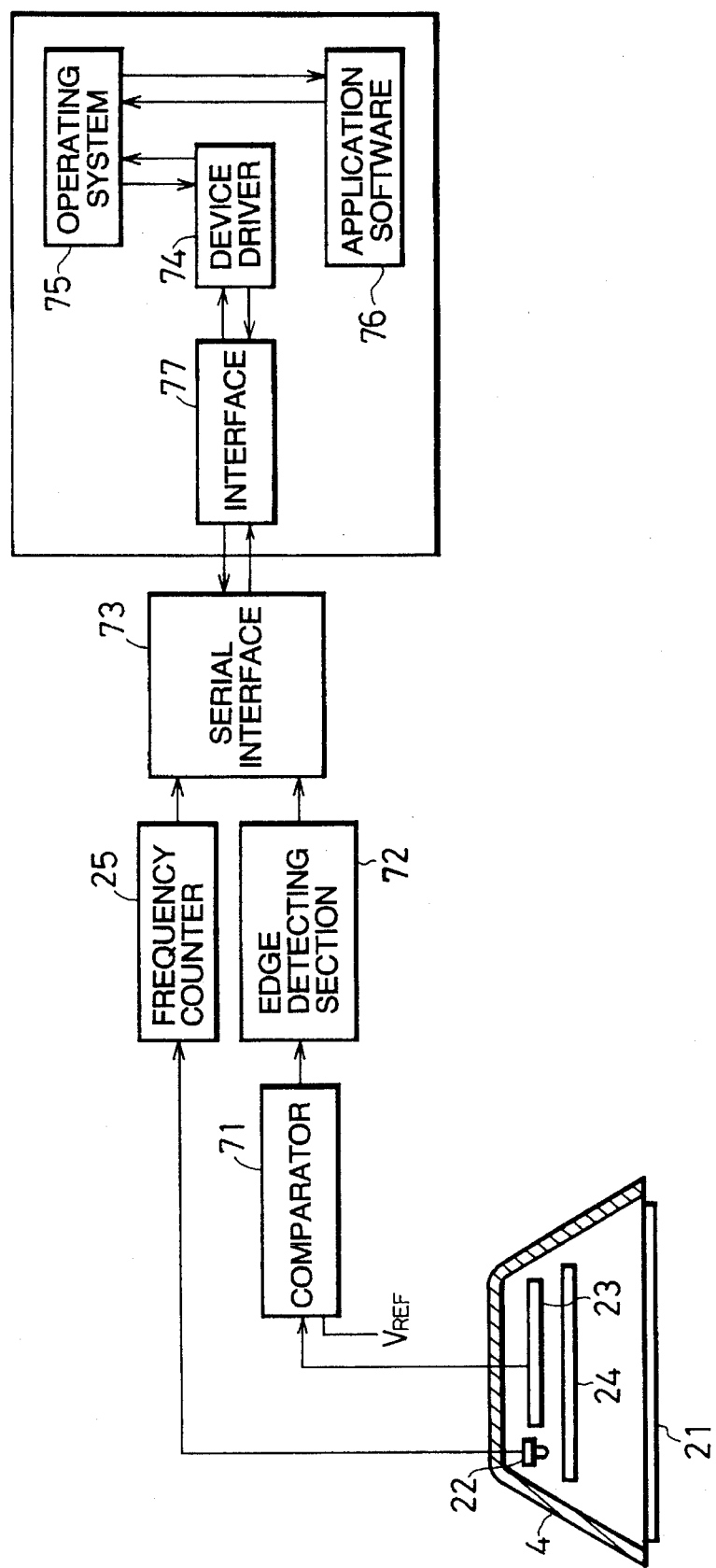
FIG. 16 is a diagram showing another embodiment of the signal processing circuit for processing the signal detected by the CCD linear image sensor.

Referring to FIG. 16, another embodiment of the signal processing circuit for processing signals detected by the CCD linear image sensor 23 will be described below. This embodiment is configured by using a comparator supplied with a reference voltage, an edge detecting section and a serial interface. As shown in FIG. 16, the output value of the CCD linear image sensor 23 is compared with the reference voltage $V_{REF}$ by the comparator 71 and two-valued on the basis of the judgment as to whether the output value is larger than the reference voltage or smaller than the reference voltage. Then, information with respect to the rising and falling of the two-valued value, that is, information with respect to pixel number as a point of rising of from 0 to 1 and pixel number as a point of falling of from 1 to 0 in the pixel number sequence in the two-valued information is detected by the edge detecting portion 72, So that the results of the detection are delivered, for example, to a higher-rank device (the aforementioned arithmetic operation and control unit 6) such as a personal computer through the serial interface 73 (such as an RS232C interface). When, for example, the CCD linear image sensor has 2048 pixels, the pixel number is information with respect to the number given to each of the 2048 pixels. This information is directly related to the concept of coordinates on the CCD linear image sensor 23. In the arithmetic operation and control unit 6 which is a so-called host computer, procedures such as calculations of the enlargement ratio, the direction and the coordinates, etc. are carried out. For this purpose, a program called "device driver" or "driver software" is added to the arithmetic operation and control unit 6 by installation. In FIG. 16, the reference numeral 74 designates such a device driver. The arithmetic operation and control unit 6 generally includes an operating system 75, application software 76 and an interface 77 as other constituent elements. Because the processing speed and processing performance of a CPU used as a general arithmetic operation and control unit have been developed highly in recent years, it is thought of that there is little influence on execution of the other application software even in the case where the procedures such as calculation of the enlargement ratio, calculation of the direction, calculation of the coordinates, etc. are carried out in the host computer side. The contents of procedures carried out by the device driver 74 are the same as the contents of the aforementioned procedures such as calculation of the enlargement ratio, calculation of the direction, calculation of the coordinates, etc. In FIG. 16, a frequency counter 25 is provided for the purpose of detecting the quantity of the continuous change of the switch to feed the quantity to the host computer side.

According to the present invention, the following effects are attained. Because the distance to the light source and the direction of incidence of the light beam can be detected by using one photodetector and accordingly two-dimensional or three-dimensional coordinates can be detected, an optical position detecting unit and an optical coordinate input unit which are simplified in structure, economical and compact can be provided.

Because a large pattern compared with the image pickup surface of the image pickup unit can be used without use of any optical system such as a lens, the visual field angle can be set widely.

By using a specific pattern having equal interval characteristic, the plurality of positions of respective parts of the pattern can be detected on the basis of output signals of a plurality of pixels provided in the image pickup unit, so that highly detecting accuracy can be achieved by statistically processing the detected signals.

Because the optical coordinate input unit can be operated when care is given to the direction of light emitted from the light-emitting portion of the position pointer with respect to only one position pointer, it is easy for an operator to operate the position pointer. Particularly, in the case of a position pointer provided with a light source having directivity, such an effect is fulfilled remarkably.

What is claimed is:

1. An optical position detecting apparatus comprising:

an input unit including a two-dimensional coordinate position detecting plane;

a position pointer having a point-like light emitting section for pointing at arbitrary positions on the two-dimensional coordinate position detecting plane;

a linear image pickup sensor including plural pixels arranged in a substantially straight line to define an image pickup surface for receiving light from the point-like light-emitting section;

a pattern disposed in front of the linear image pickup sensor at a position having a known distance, L, from the image pickup surface in a path of light emitted from the point-like light-emitting section, the pattern having a specific pattern including equi-spaced "1" and "0" code elements, parts of the specific pattern respectively corresponding to light emitting positions of the position pointer, one of the parts being projected onto the linear image pickup surface by light emitted from the point-like light-emitting section, the code elements extending in a direction parallel to a direction in which the pixels extend; and a signal processing means for processing signals detected by the linear image pickup sensor, the detected signals being derived from the pixels in response to the pixels sensing an image of the part of a specific pattern projected onto the image pickup surface so positions of the code elements included in the image are obtained from the detected signals, the detected signals being combined in the signal processing means so: (a) a distance in the image is determined by the obtained positions of the code elements, (b) an enlargement image ratio, m, is determined as a ratio of an interval between the code elements in the specific pattern and the determined distance, and (c) a distance from the point-like light-emitting section to the linear image pickup sensor along a line normal to the image pickup surface is determined in accordance with $\{m/(m-1)\} \times L$.

2. An optical position detecting apparatus according to claim 1, wherein the signal processing means derives (d) the positions of the code elements including in the image from the signals derived from the plural pixels sensing the image in response to an indication of image center of gravity, and (e) a correspondence relationship between the positions of the code elements included in the image and the positions of the code elements on a straight line by a least square calculation technique, and (f) the enlargement ratio as an indication of a slope of the straight line.

3. An optical position detecting apparatus according to claim 2, wherein the specific pattern including the plural code elements has an M-sequence characteristic, and the signal processing means determines (g) a discrete coordinate based on a digital code obtained by the signals derived from the plural pixels sensing the image, and (h) a direction of light incident on the image pickup surface based on the discrete coordinate, an intercept of the straight line, and the known distance.

4. An optical coordinate input system comprising:

an optical position detecting apparatus including an input unit having a two-dimensional coordinate position-detecting plane, and a position pointer having a point-like light emitting section for pointing at arbitrary positions on the two-dimensional coordinate position detecting plane, said optical position detecting apparatus further comprising:

(a) a linear image pickup sensor including plural pixels arranged in a substantially straight line to define an image pickup surface for receiving light from the point-like light-emitting section;

(b) a pattern disposed in front of said linear image pickup sensor at a position of known distance, L, from the image pickup surface in a path of light emitted from the point-like emitting section, the pattern having a specific pattern including equi-spaced plural "1" and "0" code elements, parts of the specific pattern respectively corresponding to light emitting positions of the position pointer, one of the parts being projected onto the linear image pickup surface by light emitted from the point-like light-emitting section, the code elements extending in a direction parallel to a direction in which the pixels extend; and (c) a signal processing means for processing signals detected by the linear image pickup sensor, the detected signals being derived from the pixels in response to the pixels sensing an image of the part of a specific pattern projected onto the image pickup surface so positions of the code elements included in the image are obtained from the detected signals, the detected signals being combined in the signal processing means so: (i) positions of the code elements included in the image are determined from the detected signals, (ii) a distance in the image is determined by the obtained positions of the code elements, and (iii) an enlargement ratio, m, is determined by a ratio of the interval between the code elements in the specific pattern and the calculated distance, a distance from the point-like light-emitting section to the linear image pickup sensor along a line normal to the image pickup surface is determined in accordance with $\{m/(m-1)\} \times L$.

5. An optical position detecting apparatus according to claim 4, wherein the signal processing means derives (iv) the positions of the code elements including in the image from the signals derived from the plural pixels sensing the image in response to an indication of image center of gravity, and (v) a correspondence relationship between the positions of the code elements included in the image and the positions of the code elements on a straight line by a least square calculation technique, and (vi) the enlargement ratio as an indication of a slope of the straight line.

6. An optical position detecting apparatus according to claim 5, wherein the specific pattern including the plural code elements has an M-sequence characteristic, and the signal processing means determines (vii) a discrete coordinate based on a digital code obtained by the signals derived from the plural pixels sensing the image, and (viii) a direction of light incident on the image pickup surface based on the discrete coordinate, an intercept of the straight line, and the known distance.

7. An optical coordinate input system according to claim 4, further comprising a display unit for displaying information with respect to coordinates of positions indicated by the position pointer, wherein a coordinate input surface on which the position pointer is operated is a display screen of the display unit.

8. An optical coordinate input system according to claim 4, further comprising a display unit for displaying information with respect to coordinates of positions indicated by the position pointer, the position pointer being adapted to be placed on a finger of an operator, and the display unit being adapted to display motions of the position pointer which moves with the finger.

9. An optical position detecting method comprising the steps of:

generating an image of a part of a specific pattern including plural equi-spaced "1" and "0" code elements having an M-sequence characteristic on an image pickup surface of an image pickup sensor in response to light from a point-like light-emitting means, the linear image pickup sensor being spaced from the pattern means by a known distance, L, the code elements extending parallel to a direction pixels in the image pickup surface extend;

deriving an indication of positions of the code elements included in the image of the part generated on the image pickup surface in response to the signals detected by the pixels of the image pickup sensor;

responding to the derived indications of the positions of the code elements to derive an indication of a distance included in the image;

responding to an indication of a ratio of the spacing between the code elements in the specific pattern and the determined distance to determine an enlargement ratio, m; and responding to the determined indication of m and the known value of L to determine a distance between the point-like light-emitting means and the linear image pickup sensor along a normal line from the image pickup surface in accordance with $\{m/(m-1)\} \times L$.

10. An optical position detecting method according to claim 9, further comprising the steps of:

determining the positions of the code elements included in the image from the signals derived from the plural pixels sensing the image by determining the sensed image center of gravity;

determining a correspondence relationship between the positions of the code elements included in the image and the positions of the code elements as a straight line by using a least square calculation method, and determining the enlargement ratio from a slope of the straight line.

11. An optical position detecting method according to claim 10, further comprising the steps of:

determining a discrete coordinate based on a digital code resulting from the signals derived from the plural pixels sensing the part of the image;

determining a direction of incidence of the light on the image pickup surface based on the discrete coordinate, an intercept of the straight line, and the known distance; and obtaining coordinate data of the positions indicated by the point-like light-emitting means based on said distance along the direction of the normal line and the direction of incidence of the light.

* * * * *